United States Patent
Brown et al.

(10) Patent No.: US 6,219,197 B1
(45) Date of Patent: Apr. 17, 2001

(54) METHOD AND APPARATUS FOR SERVO POSITIONING IN A DIRECT ACCESS STORAGE DEVICE WITH A TRANSDUCER READ ELEMENT WIDTH GREATER THAN ⅓ AND LESS THAN ½ WIDTH OF A DATA CYLINDER

(75) Inventors: Dana Henry Brown; Mark David Hagen; John Charles Purkett, all of Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1076 days.

(21) Appl. No.: 08/632,639

(22) Filed: Apr. 15, 1996

Related U.S. Application Data

(63) Continuation of application No. 08/194,235, filed on Feb. 10, 1994, now abandoned.

(51) Int. Cl.[7] .................................................... G11B 5/596
(52) U.S. Cl. ........................................... 360/77.08; 360/48
(58) Field of Search ................................. 360/44, 50, 53, 360/58, 77.06–77.08, 121, 119, 48

(56) References Cited

U.S. PATENT DOCUMENTS

| | | | |
|---|---|---|---|
| 4,549,232 | * 10/1985 | Axmear et al. ......................... 360/77 |
| 4,669,004 | * 5/1987 | Moon et al. ............................ 360/77 |
| 4,675,758 | * 6/1987 | Tanaka ................................... 360/75 |
| 5,055,951 | 10/1991 | Behr . | |
| 5,119,248 | 6/1992 | Bizjak et al. . | |
| 5,164,869 | * 11/1992 | Fontana, Jr. et al. ................ 360/113 |
| 5,235,478 | * 8/1993 | Hoshimi et al. ................... 360/77.08 |
| 5,331,492 | * 7/1994 | Komai et al. ...................... 360/77.06 |

FOREIGN PATENT DOCUMENTS 0129708  1/1985  (EP) .

OTHER PUBLICATIONS

Search Report—GB9501719.0.

* cited by examiner

*Primary Examiner*—Hoa T. Nguyen
*Assistant Examiner*—James L Habermehl
(74) *Attorney, Agent, or Firm*—Joan Pennington

(57) ABSTRACT

A phase modulated servo method and apparatus provide acceptable position linearity for servo positioning with a narrow transducer head in a disk file. The disk file includes at least one disk mounted for rotation about an axis and the disk has at least one disk surface for storing data and has at least one transducer mounted for movement across the disk surface for writing to and for reading data and servo patterns from the disk surface. The transducer includes a read element and a write element. The read element has a width less than the write element and the read element width is greater than ⅓ of a data cylinder and less than ½ of a data cylinder. A servo pattern is written on the data disk surface having a track pitch of less than ½ of a data cylinder and the servo pattern repeats in a selected binary number of data cylinders.

7 Claims, 3 Drawing Sheets

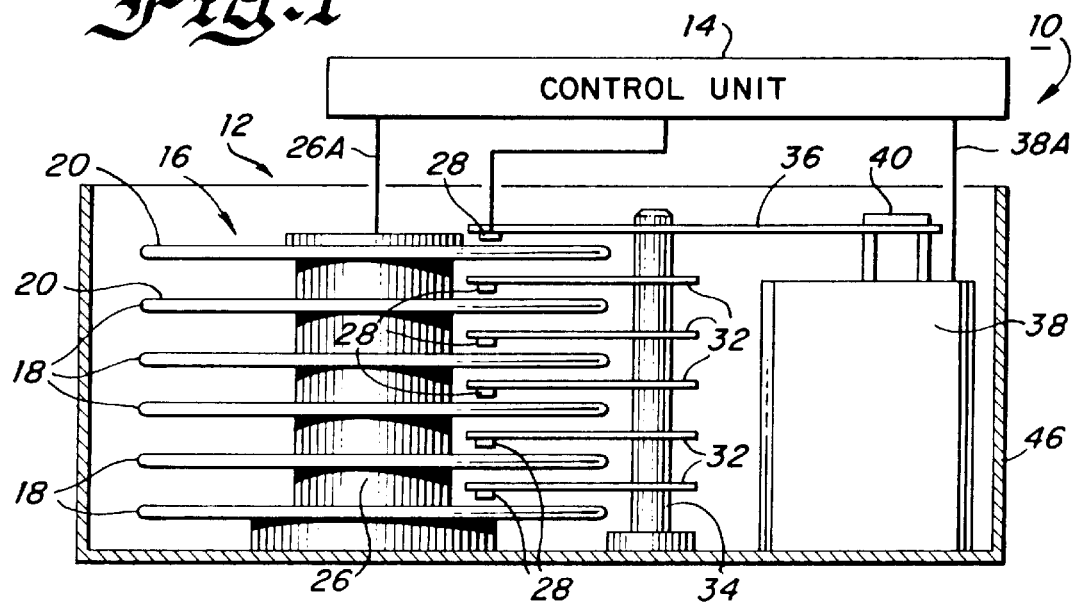
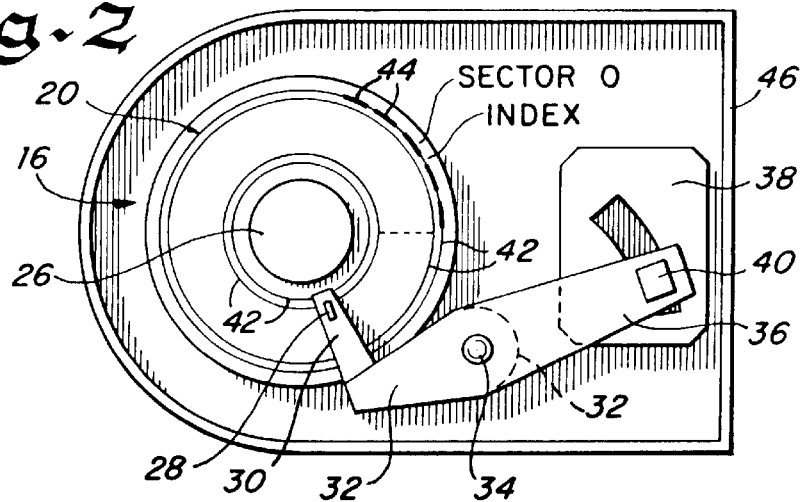

METHOD AND APPARATUS FOR SERVO POSITIONING IN A DIRECT ACCESS STORAGE DEVICE WITH A TRANSDUCER READ ELEMENT WIDTH GREATER THAN ⅓ AND LESS THAN ½ WIDTH OF A DATA CYLINDER

This application is a continuation of application Ser. No. 08/194,235 Feb. 10, 1994, now abandoned.

BACKGROUND OF THE INVENTION

1. Field of the Invention

The present invention relates generally to an actuator positioning system in a direct access storage device (DASD) and more particularly to a phase modulated servo positioning method and apparatus for use with narrow transducer heads in a disk file.

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks.

All DASD units must have a method to position each data head over the proper radial location to write a track and again, to position it very close to the same location to read the track. With the higher level files using a voice coil type of actuator, a feedback mechanism must be provided to locate and stably hold the heads on a given track. Typically, track accessing and track following are provided utilizing a magnetically written pattern in the DASD unit. A dedicated servo system employs one surface of one of the disks in the DASD on which to have all the tracking and access information. A sector servo system uses small portions of tracks between each or between several sectors on each track of each data surface to provide the tracking and access information. A hybrid servo system uses both to obtain advantages of each type of servo.

Magneto-resistive (MR) heads are a great advancement in read/write technology for DASD. One of the key advantages of MR heads is the use of separate elements for reading and writing. This allows the writing element to be wide, almost a full track pitch in width, and the reading element to be narrow. This write wide, read narrow capability eases the track misregistration (TMR) requirements on the servo system by effectively increasing the width of the soft-error rate (SER) bathtubs by the difference in widths between the read and write elements.

Servo tracks are typically written on a ½ track pitch. A traditional phase pattern is written so that the phase of each burst changes 22.5 degrees for each written servo track. For increasing track types, the phase is advanced in bursts 1 and 3 and retarded in burst 2. In this fashion, the phase between burst 1 and burst 2 changes 45 degrees for each servo track written.

This means that a 5 Mhz pattern can be written with a 80 Mhz clock. In this case the 5 Mhz period consists of 16, 80 Mhz clocks and the phase of each burst is changed by one bit for each servo track written. Then the difference in phase between the bursts repeats in eight servo tracks. The eight servo tracks written on a ½ track pitch correspond to four data tracks or cylinders.

To optimize the SER, a reading transducer width that is less than 50% of the track pitch is required. With reading elements less than the width of a single servo track, position linearity becomes unacceptably poor with the conventional ½ track pitch servo tracks. Linearity error can be improved by writing narrower tracks. For example, the phase pattern written on a ¼ track pitch would provide acceptable position linearity; however, this would double the time required for servo writing and would be prohibitively expensive for a sector servo file.

If a conventional servo pattern is written on a narrow track pitch, for example, ⅜ track pitch, the position linearity requirements will be satisfied, but the pattern will repeat in three data cylinders instead of four. This means that the position error signal (PES) extends +/−1.5 tracks instead of +/−2 tracks before the PES repeats. When seeking, this 50% loss in range is significant. Seek velocities can be as high as 40 or 50 tracks/sample. This means that position must be estimated 50 tracks away, therefor the PES error must never be greater than 1.5 tracks out of 50, or 3%. If the error is greater than this amount, the estimator algorithm may converge on the wrong position and velocity and be off by modulo three tracks. As a result a conventional servo pattern with a narrow track pitch pattern is unacceptable.

SUMMARY OF THE INVENTION

It is a principal object of the present invention to provide a phase modulated servo method and apparatus for use with narrow transducer heads.

In brief, the objects and advantages of the present invention are achieved by a phase modulated servo method and apparatus to provide acceptable position linearity for servo positioning with a narrow transducer head in a disk file. The disk file includes at least one disk mounted for rotation about an axis and the disk has at least one disk surface for storing data and has a transducer mounted for movement across the disk surface for writing to and for reading data and servo patterns from the disk surface. The transducer includes a read element and a write element. The read element has a width less than the write element and the read element width is less than ½ of the width of a data cylinder. A servo pattern is written on the data disk surface having a track pitch of less than ½ of the width of a data cylinder and the servo pattern repeats in a selected binary number of data cylinders.

BRIEF DESCRIPTION OF THE DRAWING

The present invention, together with the above and other objects and advantages, can best be understood from the following detailed description of the embodiment of the invention illustrated in the drawing, wherein:

FIG. 1 is a schematic and block diagram of a data storage disk file embodying the present invention;

FIG. 2 is a diagram showing the accessing mechanism for a single disk surface of the apparatus of FIG. 1;

DETAILED DESCRIPTION OF THE PREFERRED EMBODIMENTS

Figure 3:
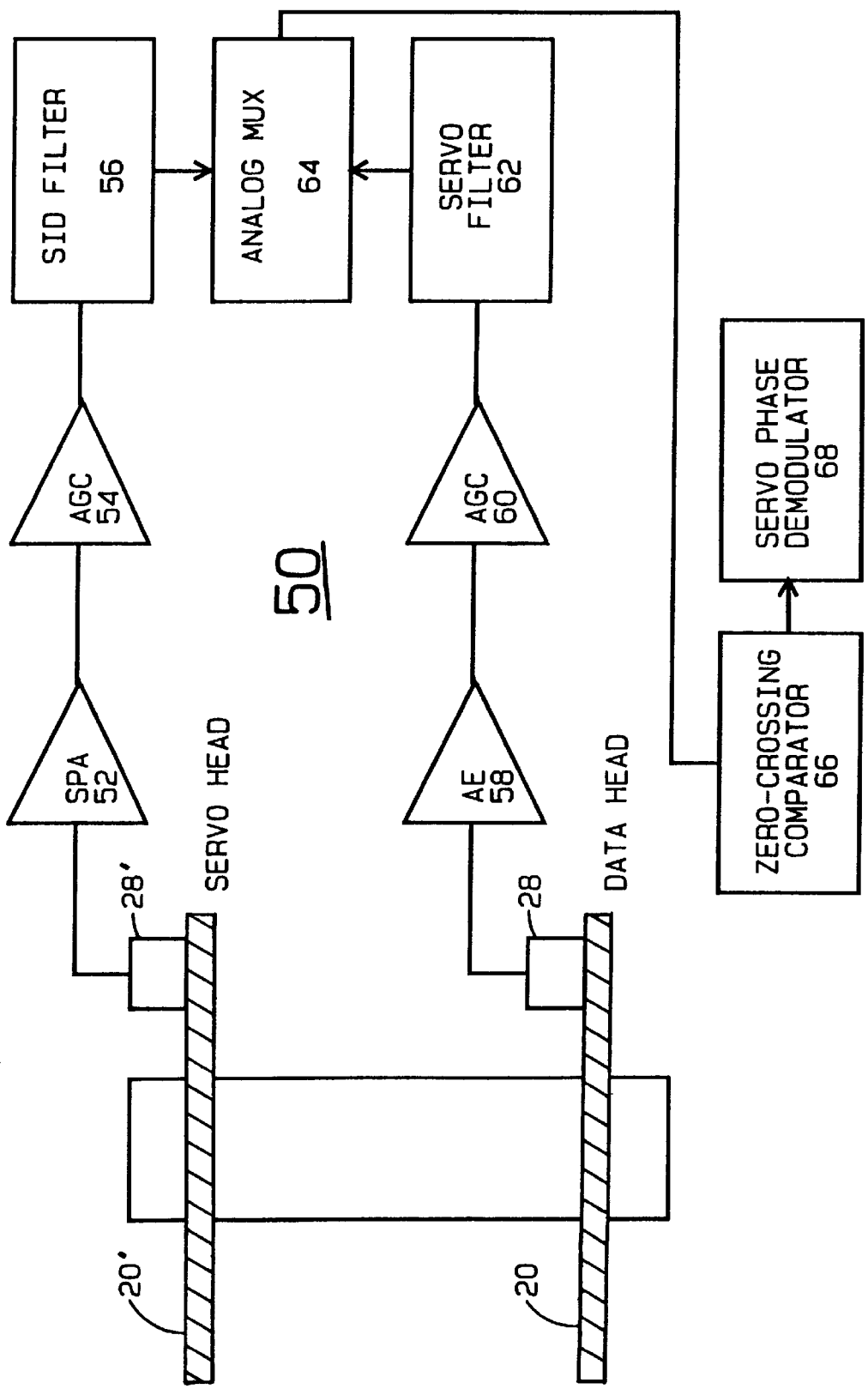
FIG. 3 is a block diagram representation illustrating apparatus for carrying out the servo positioning method according to the present invention in the data storage disk file of FIG. 1.

In FIG. 1 there is shown a partial schematic block diagram of parts of a data storage disk file 10 including a data storage medium generally designated as 12 and a control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 40 cooperating with a magnet and core assembly (not seen) operatively controlled for moving the transducer heads 28 in synchronism in a radial direction in order to position the heads in registration with data information tracks or data cylinders 42 to be followed and access particular data sectors 44. Data storage disk file 10 is a modular unit including a housing 46. The various components of the disk file 10 are controlled in operation by signals generated by control unit 14 such as motor control signals on line 26A and position control signals on line 38A.

Numerous data information tracks 42 each at a specific radial location are arrayed in a concentric pattern in the magnetic medium of each disk surface 20 of data disks 18. A data cylinder includes a set of corresponding data information tracks 42 for the data surfaces 20 in the data storage disk file 10. Data information tracks 42 include a plurality of segments or data sectors 44, each containing a predefined size of individual groups of data records which are saved for later retrieval and updates. The data information tracks 42 are disposed at predetermined positions relative to a servo reference index. In FIG. 2 one sector 44 is illustrated as SECTOR 0 with a fixed index or mark INDEX for properly locating the first data sector. The location of each next sector 44 is identified by a sector identification (SID) pulse read by transducer heads 28 from surfaces 20.

Referring to FIG. 3, there is shown a circuit diagram illustrating phase modulated servo apparatus for carrying out the phase modulated servo method of the invention generally designated by the reference numeral 50. Apparatus 50 includes a servo channel including a dedicated servo surface 20' shown together with a dedicated servo transducer head 28' coupled to a servo preamplifier (SPA) 52, an automatic gain control (AGC) 54 and a servo identification (SID) filter 56. A data channel includes a data transducer head 28 disposed adjacent a data surface 20, arm electronics (AE) 58, an automatic gain control (AGC) 60 and a servo filter 62.

While FIG. 3 shows circuitry 50 with a dedicated servo architecture with reference tracks, it should be understood that the invention advantageously applies to sector servo architectures. The phase information stored in the servo patterns is derived by extracting a fundamental harmonic, such as 2.5 Mhz, from the readback signal by the high-pass SID filter 56 and servo filter 62. Signals from either the dedicated servo head 28' or servo patterns read by data transducer head 28, are multiplexed at an analog multiplexer block 64. A zero-crossing comparator detector 66 coupled to the multiplexer 64 detects the zero crossing in the readback signal. The output of the comparator 66 is supplied to a servo phase demodulator 68.

Comparator 66 applies a square wave signal to the servo phase demodulator 68 with precise phase transitions based on the zero crossings of the first harmonic signal. This square wave is then exclusive ORed or XORed with a 2.5 Mhz crystal oscillator and the transition differences between these two signals are integrated over a certain period by servo phase demodulator 68. The integrator value at the end of this period is proportional to the head offset relative to the track center line. This value is referred to as the position error signal (PES).

In the traditional phase pattern, although each burst changes phase 22.5 degrees between servo tracks, the difference between burst 1 and burst 2 is always 45 degrees. So for a given track, the servowriter only needs a resolution of 45 degrees or ⅛ of a period instead of 22.5 degrees or 1/16 of a period. The required 16 servo track types are generated by changing the phase of each burst in turn. That is, advancing the phase of burst 1 by 45 degrees while holding burst two the same as the previous track. Then retarding the phase of burst 2 while holding burst 1 the same as the previous track. This technique for the traditional phase pattern track types and burst phase is set forth in the following Table 1.

TABLE 1

| Servo Track Type | Burst 1,3 Phase | Burst 2 Phase |
|---|---|---|
| 0 | 0 | 0 |
| 1 | 45 | 0 |
| 2 | 45 | −45 |
| 3 | 90 | −45 |
| 4 | 90 | −90 |
| 5 | 135 | −90 |
| 6 | 135 | −135 |
| 7 | 180 | −135 |
| 8 | 180 | 180 |
| 9 | −135 | 180 |
| 10 | −135 | 135 |
| 11 | −90 | 135 |
| 12 | −90 | 90 |
| 13 | −45 | 90 |
| 14 | −45 | 45 |
| 15 | 0 | 45 |

Using this technique, a 5 Mhz servo pattern can be written with a 40 Mhz clock instead of an 80 Mhz clock. Additionally, the original 22.5 degree steps can be duplicated by switching in a 22.5 degrees (25 nsec) delay during even tracks.

Figure 4:
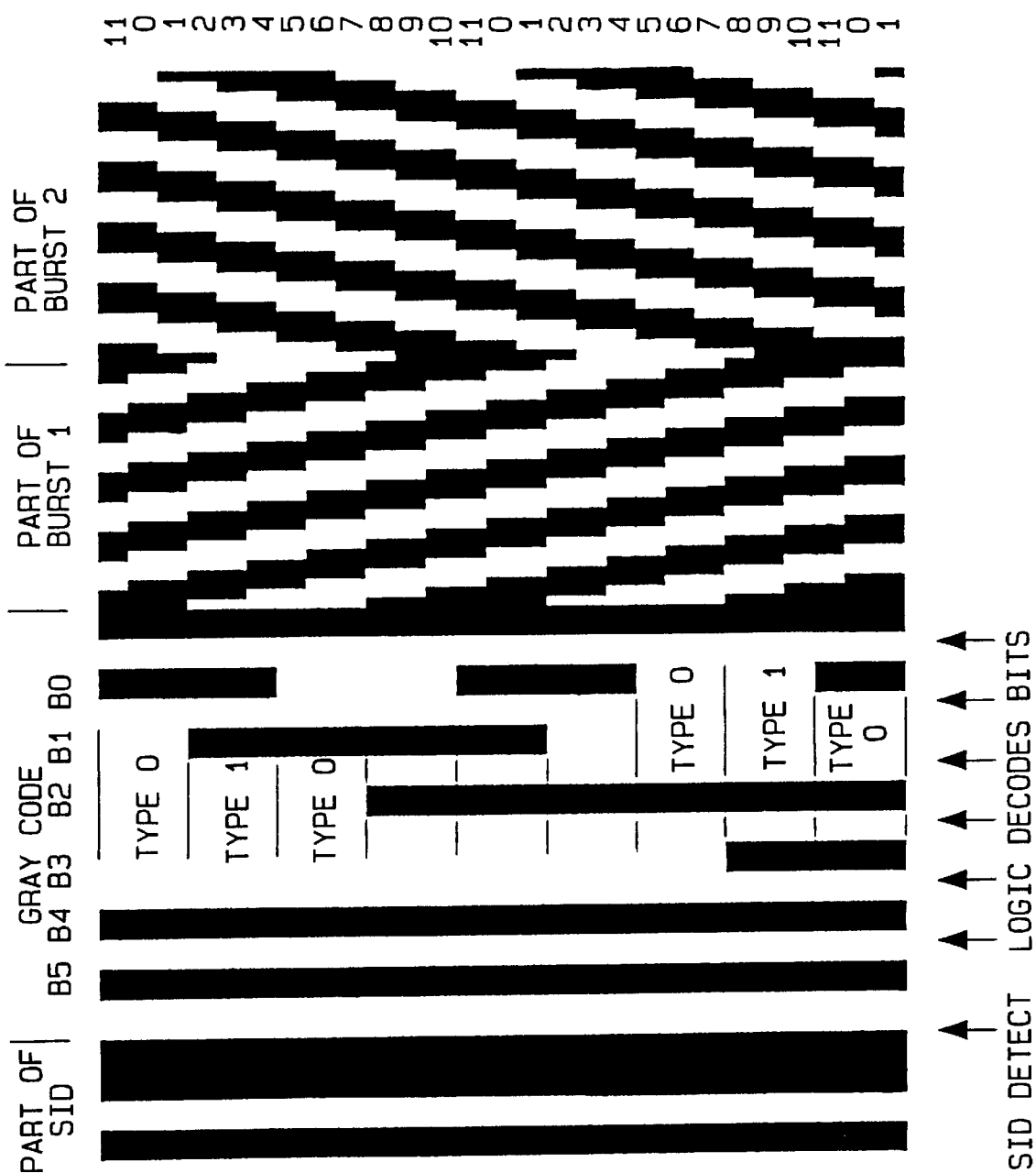
FIG. 4 is a chart illustrating a servo pattern written on ⅓ track pitch in accordance with the invention.

Referring to FIG. 4, a servo pattern written on ⅓ track pitch is shown with radius changes relative the vertical axis and circumferential changes relative the horizontal axis. In accordance with a feature of invention, the track pitch of the written servo pattern is less than the conventional ½ track pitch to provide acceptable position linearity with disk file including a MR transducer head and the servo pattern repeats in a selected number of cylinders or data tracks. The selected number of data cylinders is a positive power of two number of cylinders, such as, 2, 4 or 8. A servo pattern repeating in 3 cylinders would not be selected.

In order to have a pattern that repeats in four tracks, the phase difference between burst 1 and burst 2 must go through 360 degrees in four tracks. When written on a ½ track pitch, the burst period is split into eight phases and is written with a clock eight times the burst frequency. When the servo tracks are written on a ⅓ track pitch, 12 servo tracks are written for four data cylinders. In this case the phase burst must be split into 12 phases and is written with a clock 12 times the burst frequency. For example, if a 5 Mhz pattern is required and ⅓ tracks are needed for acceptable linearity, then the pattern can be written with a 60 Mhz clock. In this case the 5 Mhz period consists of 12, 60 Mhz clocks and the phase of each burst is changed by one bit for each servo track written. The latch servo track writer (STW) presently used in manufacturing can easily be programmed to write using either 12 or 16 bit words so a ⅓ track pitch pattern is easy to implement.

other implementations of the invention are also possible. For example, writing on a ⅓ (33%) track pitch with the STW clock corresponding to ⅘ of the demodulator clock and with 12 bits to each servo pattern period. Alternatively, writing on a 40% track pitch with the STW clock corresponding to ⅘ of the demodulator clock and with 10 bits to each servo pattern period. Another alternative is writing on a ⅓ track pitch and having two track types instead of four track types and the STW clock must be ⅔ of the demodulator lock.

Advantages of the ⅓ track pitch pattern as illustrated in FIG. 4 are that the MR read element width an be optimized based on SER and not on servo linearity; allowing MR read elements to be less than 50% of the track pitch; and with three servo tracks per data cylinder, the cylinder boundary is coincident with the edge of the servo tracks. This makes the placement of a Gray code track id pattern easy to implement. Servo writing time for the ⅓ track pitch is significantly reduced as compared to a ¼ track pitch.

While the invention has been described with reference to details of the illustrated embodiments, these details are not intended to limit the scope of the invention as defined in the appended claims.

What is claimed and desired to be secured by letters patent of the United States is:

1. Apparatus for servo positioning in a disk file comprising:

at least one disk mounted for rotation about an axis and having at least one disk surface for storing data;

transducer means mounted for movement across said disk surface for writing to and for reading data and servo patterns from said disk surface; said transducer means including a read element and a write element, said read element having a width less than said write element and said read element being greater than ⅓ of the width of a data cylinder and less than ½ the width of the data cylinder; and a servo pattern written on said data disk surface having a non-zero track pitch of less than ½ of the width of a data cylinder and said servo pattern repeating in a selected number of data cylinders; said selected number being a value equal to a positive power of two.

2. Apparatus for servo positioning as recited in claim 1 wherein said servo pattern includes a phase modulated servo pattern.

3. Apparatus for servo positioning as recited in claim 1 wherein said servo pattern includes a servo pattern having a ⅓ track pitch and said servo pattern repeating in 4 data cylinders.

4. Apparatus for servo positioning as recited in claim 1 wherein said servo pattern is a 5 MHz pattern of 12-bit words.

5. Apparatus for servo positioning as recited in claim 1 wherein said servo pattern includes a servo pattern having a ⅓ track pitch and said servo pattern repeating in 2 data cylinders, wherein said servo pattern is a 5 MHz pattern of 6-bit words.

6. A direct access storage device comprising:

at least one disk mounted in said housing for rotation about an axis and having at least one disk surface for storing data;

magneto-resistive (MR) transducer means mounted for movement across said disk surface for writing to and for reading data and servo patterns from said disk surface; said MR transducer means including a write element and a read element, said read element having a width less than said write element and said read element width being greater than ⅓ of the width of a data cylinder and less than ½ of the width of a data cylinder; and a phase modulated servo pattern written on said disk surface at a predetermined non-zero track pitch of less than ½ of the width of a data cylinder and said servo pattern including a phase burst difference between adjacent bursts to go through 360 degrees in a predetermined number of data cylinders, said predetermined number being a value equal to a positive power of two, said predetermined non-zero track pitch defining centerlines of adjacent bursts of said phase modulated servo pattern.

7. A direct access storage device as recited in claim 6 wherein said predetermined track pitch equals ⅓ and said predetermined binary number of data cylinders equals 4.

* * * * *